(12) United States Patent
Park

(10) Patent No.: US 6,278,738 B1
(45) Date of Patent: Aug. 21, 2001

(54) METHOD AND DEVICE FOR TRANSMITTING VIDEO DATA IN RADIO COMMUNICATION SYSTEM

(75) Inventor: Dong-Seek Park, Taegu-Kwangyokshi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/001,916

(22) Filed: Dec. 31, 1997

(51) Int. Cl.[7] .............................. H04N 7/12; H04B 1/66
(52) U.S. Cl. .................................... 375/240.26; 348/425.3
(58) Field of Search .................. 375/240, 240.01, 375/240.23, 240.24, 240.25, 240.26, 240.27, 240.28; 382/244, 248; 348/425.1, 425.2, 425.3, 253, 246, 714–718; 370/914; 341/67; H04B 1/66; H04N 7/12

(56) References Cited

U.S. PATENT DOCUMENTS

| | | | |
|---|---|---|---|
| 5,440,691 | * | 8/1995 | Carafillo et al. ............... 395/250 |
| 5,631,644 | * | 5/1997 | Katata et al. ................... 341/67 |
| 5,903,775 | * | 5/1999 | Murray ........................... 395/853 |
| 6,084,910 | * | 7/2000 | Stanger et al. ................. 375/270 |
| 6,151,075 | * | 11/2000 | Shin et al. ...................... 348/459 |

* cited by examiner

*Primary Examiner*—Vu Le
*Assistant Examiner*—Tung Vo
(74) *Attorney, Agent, or Firm*—Sughrue, Mion, Zinn, Macpeak & Seas PLLC

(57) ABSTRACT

A device for transmitting video data is provided which includes a temporary memory, a standby memory, a bit counter, and a controller. The temporary memory stores N original blocks of data which are variable length coded such that a plurality of the blocks have different bit rate lengths. The standby memory sequentially stores N processed blocks such that the N processed blocks each have a bit rate length that is equal to or less than a specified bit rate length and subsequently outputs the N processed blocks to be transmitted at a fixed bit rate. The bit counter generates address signals for storing the N original blocks in the temporary memory and generates an address signal for storing the N processed blocks in the standby memory. The controller determines a data state of the N original blocks input to the temporary memory and uses the data state to control the bit counter to read original data of the N original blocks from the temporary memory at a reading bit rate which is shorter than or equal to the specified bit rate and to write the original data in the standby memory as the N processed blocks. A method performed by the device is also provided.

21 Claims, 5 Drawing Sheets

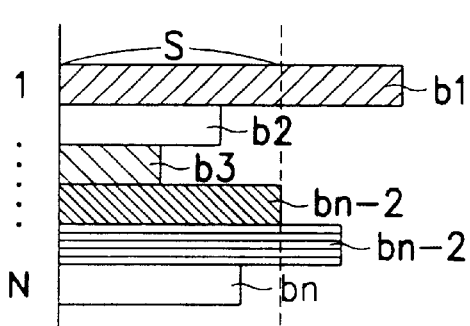
(PRIOR ART)
FIG. 1A
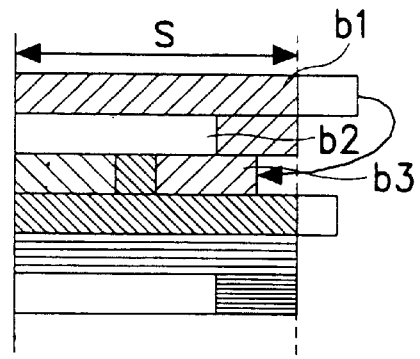
(PRIOR ART)
FIG. 1C
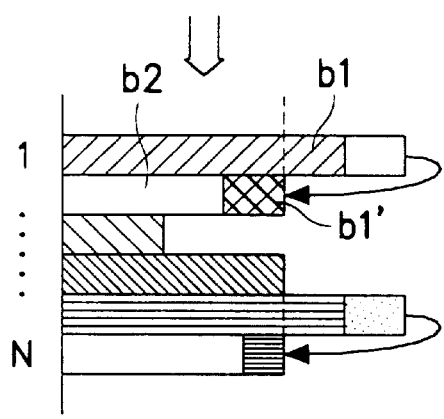
(PRIOR ART)
FIG. 1B
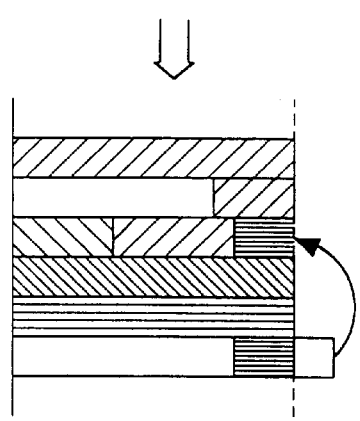
(PRIOR ART)
FIF. 1D
1~N ; VARIABLE LENGTH BLOCK
b ; BLOCK LENGTH
S ; $\frac{1}{N}\Sigma bi$

METHOD AND DEVICE FOR TRANSMITTING VIDEO DATA IN RADIO COMMUNICATION SYSTEM

FIELD OF THE INVENTION

The present invention relates to a radio communication system which uses a radio channel or a data channel that has a lower error resilience. More particularly, the invention relates to a method and device which transmits video data in a radio communication system and which is capable of overcoming the disadvantages of transmitting data in a variable bit rate stream.

BACKGROUND OF THE INVENTION

Many radio communication systems transmit data via a radio (or wireless) channel in a fixed bit rate stream. The transfer rate of such bit stream is typically 64 Kbps, and the bit error rate of the fixed bit rate stream is lower than the bit error rate of a variable bit rate stream.

Accordingly, many variable bit rates streams are converted into fixed bit rate streams in order to reduce their bit error rates. FIGS. 1A to 1D illustrate a conventional method for converting bit streams having different bit rate lengths into fixed bit rate streams having a certain bit rate length S. Such method was proposed by the NTT Mobile Communication Network of Japan in June 1995.

FIG. 1A illustrates N bit rate streams (or blocks) b1 to bn which respectively have different lengths as shown in FIG. 1A. Also all the blocks b1 to bn originate from the same starting point. Such fact is conceptually shown in FIG. 1A by the alignment of the leftmost edges of the blocks b1 to bn. However, since the blocks b1 to bn have different bit rate stream lengths, the ending points of the blocks b1 to bn are different from each other. Such fact is conceptually shown in FIG. 1A by the fact that the rightmost edges of the blocks b1 to bn are not aligned with each other. Specifically, in FIG. 1A, the bit rates of the blocks b2, b3, and bn are smaller than the specified bit rate length S, blocks b1 and bn−1 are larger than the length S, and block bn−2 is equal to the specified length S.

To transmit all of the blocks b1 to bn at a fixed bit rate, a portion 10 of the first block b1 is appended to the end of the block b2, and a portion 20 of the block bn−1 is appended to the end of the block bn. (FIG. 1B). Then, a portion 30 of the block b1 is appended to the end of the block b3. (FIG. 1C). Finally, a portion 40 of the block bn is appended to the end of the portion 30 of the block b1 which was previously appended to the end of the block b3. (FIG. 1D). Thus, none of the blocks b1 to bn extend beyond the certain bit rate length S and can be simultaneously transmitted at the same fixed bit rate S. However, all of the blocks b1 to bn still have the same starting points as shown in FIG. 1D.

Even though the conventional method described above converts the bit rates of the blocks b1 to bn into fixed bit rates and reduces the bit error rate, it takes a considerable amount of time to perform the variable length coding (VLC) process required to modify all of the blocks b1 to bn to have the same bit rate length S. Furthermore, a very long block (e.g. the block b1) needs to be divided a plurality of times and stored in the shorter blocks b2 and b3. In such instances, the processing time of the conventional method is further increased.

SUMMARY OF THE INVENTION

An object of the present invention is to provide a video data transmission method and device having reduced calculation time and complexity for a bit stream.

Another object of the present invention is to provide a video data transmission method and device with increased error resilience.

In order to achieve the above and other objects, a device for transmitting video data is provided. The device comprises: a temporary memory which stores N original blocks of data which are variable length coded such that a plurality of said blocks have different bit rate lengths; a standby memory which sequentially stores N processed blocks such that said N processed blocks each have a bit rate length that is equal to or less than a specified bit rate length and which subsequently outputs said N processed blocks to be transmitted at a fixed bit rate; a bit counter which is operably coupled to said temporary memory and said standby memory, which generates address signals for storing said N original blocks in said temporary memory, and which generates an address signal for storing said N processed blocks in said standby memory; and a controller which is coupled to said bit counter, said temporary memory, and said standby memory, which determines a data state of said N original blocks input to said temporary memory and which uses said data state to control said bit counter to read original data of said N original blocks from said temporary memory at a reading bit rate which is shorter than or equal to said specified bit rate and to write said original data in said standby memory as said N processed blocks. Also, a method employed by the device is provided.

In order to further achieve the above and other objects, another device for transmitting video data is provided. The device comprises: a temporary memory which stores N original blocks of data which are variable length coded such that a plurality of said blocks have different bit rate lengths; a standby memory which sequentially stores N processed blocks such that said N processed blocks respectively have bit rate length that are equal to a specified bit rate length and which subsequently outputs said N processed blocks to be transmitted at a fixed bit rate; a bit counter which is operably coupled to said temporary memory and said standby memory, which generates address signals for storing said N original blocks in said temporary memory, and which generates an address signal for storing said N processed blocks in said standby memory; a codec which sequentially inputs said N original blocks from said temporary memory, which converts said N original blocks into said N processed blocks, and which outputs said N processed blocks to said standby memory; and a controller which is coupled to said bit counter, said temporary memory, said standby memory, and said codec, which determines a data state of said N original blocks input to said temporary memory and which uses said data state to control a manner in which said codec converts said N original blocks into said N processed blocks. Also, a method employed by the device is provided.

BRIEF DESCRIPTION OF THE DRAWINGS

The above and other objects, features, and advantages of the present invention will become more apparent in the light of the following detailed description of an illustrative embodiment of the invention and in light of the attached drawings in which:

FIG. 1A is a diagram illustrating various bit rate streams having different lengths;

FIG. 1B is a diagram illustrating a first step for converting the various bit rate streams shown in FIG. 1A into fixed bit rate streams;

FIG. 1C is a diagram illustrating a second step for converting the various bit rate streams shown in FIG. 1A into fixed bit rate streams;

FIG. 1D is a diagram illustrating the bit rate streams shown in FIG. 1B after they have been converted into fixed bit rate streams;

DETAILED DESCRIPTION OF THE PREFERRED EMBODIMENTS

The following description of the preferred embodiments discloses specific circuit configurations, components, values, etc. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to the specific components and values described below. Furthermore, the descriptions of various features and structures of the present invention which would be known to one skilled in the art are omitted for the sake of clarity and brevity.

Figure 2:
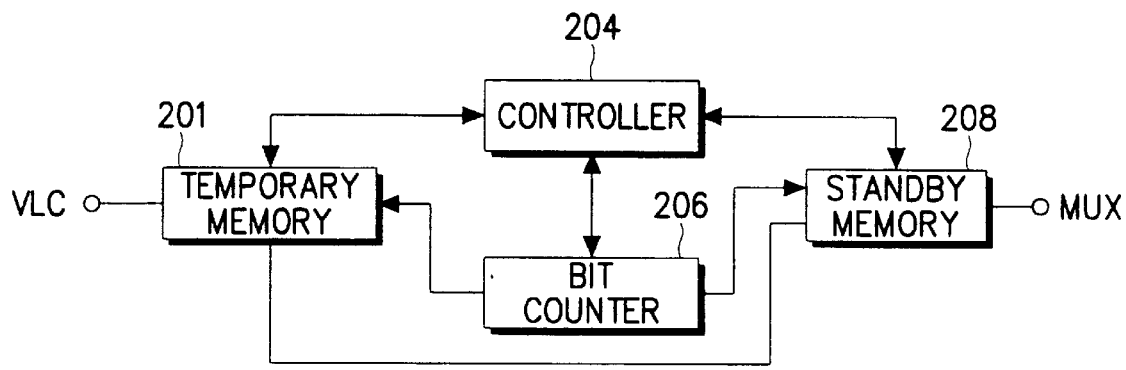
FIG. 2 is a block diagram of a video data transmission device according to a preferred embodiment of the present invention.

FIG. 2 illustrates a video data transmission device in accordance with one embodiment of the present invention. As shown in the figure, the device comprises a temporary memory 201, a controller 204, a bit counter 206, and a standby memory 208. The temporary memory 201 temporarily stores N variable length coding ("VLC") data blocks (or symbols) b1 to bn. The controller 204 evaluates the state of the original blocks b1 to bn input to the temporary memory 201 and outputs control signals the bit counter 206 based on the state of the original blocks b1 to bn. In response to the control signals, the bit counter 206 generates address signals for storing the blocks b1 to bn, reads the blocks b1 to bn from the temporary memory 201 at a bit rate which is smaller than or equal to a specified bit rate S1, and generates address signals for writing the original blocks b1 to bn into the standby memory 208 to form new blocks b1' to bn'. The standby memory 208 sequentially stores the new blocks b1' to bn' at a bit rate which is smaller than or equal to the specified rate S1, and subsequently the new blocks b1' to bn' are read from the standby memory 208 and transmitted.

Figures 3A, 3B:
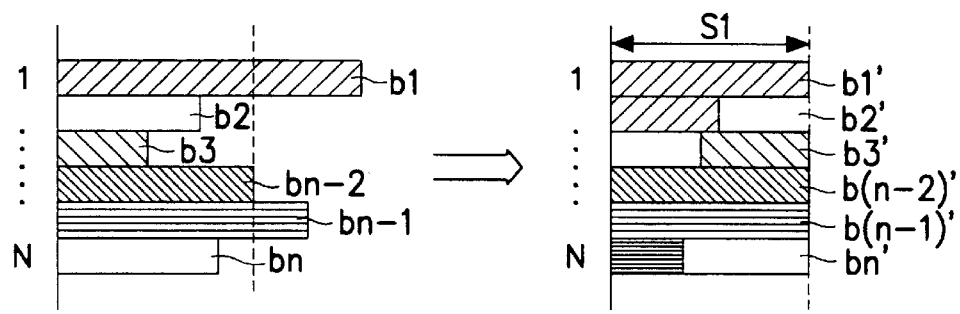
FIG. 3A is a diagram for showing a bit planarization (or equalization) process according to a preferred embodiment of the present invention.
FIG. 3B is another diagram for showing a bit planarization (or equalization) process according to a preferred embodiment of the present invention.

FIG. 3A illustrates an example of the N original blocks b1 to bn that are stored in the temporary memory 201. As shown in the figure, the memory has N memory blocks 1 to N for respectively storing the original blocks b1 to bn, and the original blocks b1 to bn respectively have different bit rate streams but originate from the same starting point. Since the blocks b1 to bn have different bit rate streams, the ending points of the blocks b1 to bn are different from each other. In particular, the bit rates of the blocks b2, b3, and bn are smaller than a specified bit rate length S1, blocks b1 and bn−1 are larger than the length S1, and block bn−2 is equal to the specified length S.

FIG. 3B illustrates an example of N new blocks b1' to bn' which have been processed by the transmission device and stored in the standby memory 208 based on the address signals generated from the bit counter 206. Such blocks b1' to bn' are generated by processing the original blocks b1 to bn in the temporary memory 201 based on a method described below. As shown in the figure, none of the new blocks b1' to bn' extend beyond the bit rate length S1, and thus, they can be simultaneously transmitted at the same fixed bit rate S1. Also, the original blocks b1 to bn are processed such that the starting points of the original blocks b1 to bn within the new blocks b1' to bn' are different.

Figure 4:
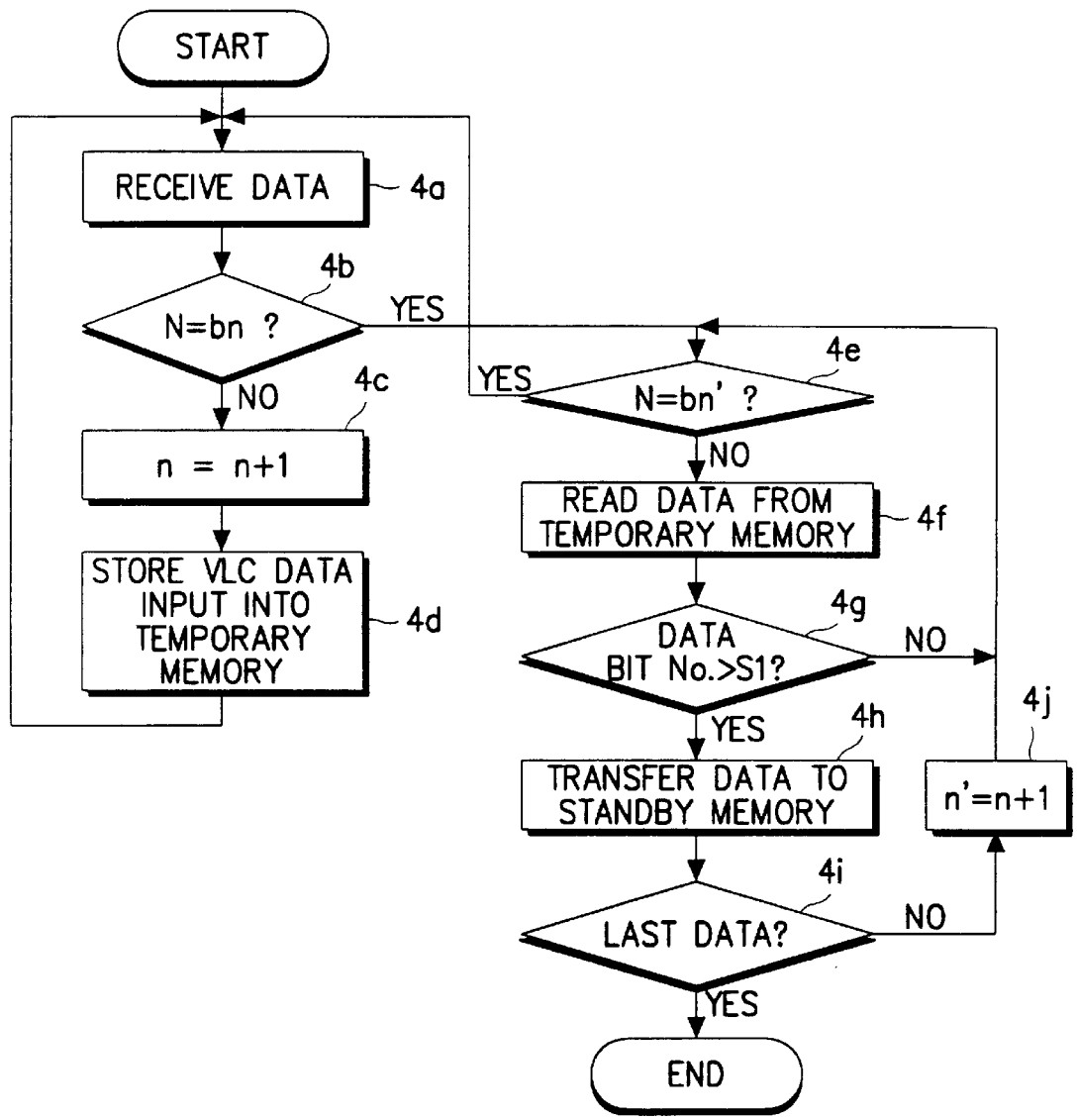
FIG. 4 is a flow chart of a method for transmitting video data which is employed by the device shown in FIG. 2.

FIG. 4 shows a flow chart of an illustrative method for processing the N original blocks b1 to bn stored in the temporary memory 201 to produce N new blocks b1' to bn' and for transferring the blocks b1' to bn' to the standby memory 208. The flow chart comprises four main processing steps. In the first step, the controller 204 controls the bit counter 206 such that the N blocks b1 to bn are sequentially stored in the temporary memory 201 as shown in FIG. 3A. In the second step, the controller 204 determines if the block bx currently being stored in the memory 201 is the last block bn. If the current block bx is the last block bn, the controller 204 sequentially reads data of blocks b1 to bn stored in the temporary memory 201 to determine if the bit rates of the blocks b1 to bn are larger or smaller than the specified bit rate S1. In the third step, if a particular original block bx is larger than the specified bit rate S1, the controller 204 controls the bit counter 206 such that only a portion of the particular original block bx is transferred to and stored in the standby memory 208 as a new block bx' so that the new block bx' remains within the specified bit rate S1. The remaining data for the original block bx is stored as the first portion of the next new ie block b(x+1)'. In the fourth step, the data for the next original block bx+1 is read from the temporary memory 201, transferred to the standby memory 208, and appended to the end of the new block b(x+1)'. Then, the process above is repeated until all of the data for the original blocks b1 to bn is processed and stored in the standby memory 208 as new blocks b1' to bn'.

A more detailed description of the process illustrated in FIG. 4 will be described below. First, the controller 204 sets the temporary memory 201 in a write mode and instructs the bit counter 206 to generate address signals so that the temporary memory 201 can begin receiving data corresponding to a first original block b1 of N original blocks b1 to bn (step 4a). Then, the controller 204 determines if the data of the original block bx (i.e. the first original block b1) currently being received corresponds to data for the last original block bn (step 4b). If the current original block bx is not the last block bn, the controller 204 instructs the bit counter 206 to output address signals to prepare the temporary memory 201 to receive data for the next block bx+1 (step 4c) and instructs the bit counter 206 and memory 201 to store the data for the current original block bx (step 4d). Steps 4a to 4d are repeated until the data for the N original blocks b1 to bn are sequentially stored in the memory 201 as shown in FIG. 3A. If If the controller 204 determines that the last original block bn has been stored in the temporary memory 201 in step 4b, the controller 204 sets the temporary memory 201 in a read mode and instructs the bit counter 206 to generate the appropriate address signals to sequentially read the data corresponding to the original blocks b1 to bn from the memory 201. Then, the controller 204 determines if the data of the last new block bn' has been written to the standby memory 208 (step 4e). If the data of the block bn' has not been written, the data corresponding to the currently received block bx (i.e. the first block b1) is sequentially read from the temporary memory 201 (step 4f). Then, the controller 204 determines if the amount of data read from the temporary memory 201 will cause the specified bit rate length S1 to be exceeded (step 4g). If the amount of data read from the memory 201 is less than the bit rate length S1, then steps 4e to 4g are repeated. On the other hand, when the amount of data read from the memory 201 equals the bit rate length S1, the data is stored in the standby memory 208 (step 4h) as the new block bx'. Thus, if the bit rate length of the currently received original block bx is longer than the length S1, only a portion of the original block bx is stored in the standby memory 208 in step 4h as the new block bx'. On the other hand, if the bit rate length of the currently received original block bx is shorter than the length S1, the entire portion of the original block bx and at least some of the next original block bx+1 is stored in the memory 208 as the new block bx'.

After the new block bx' is stored in the standby memory 208, the controller 204 determines if all of the data for the current set of N original blocks b1 to bn has been processed as well as all subsequent sets of N original blocks b1 to bn (step 4i). If all sets of blocks n1 to bn have not been processed, the controller 204 instructs the bit counter 206 to generate address signals to prepare the standby memory 208 to receive the next new block b(x+1)' (step 4j).

Then, in step 4e, the controller 204 determines if the data of the last new block bn' has been written to the memory 208. If such data has not been written, the data of the original blocks b1 to bn continues to be subsequently read from the memory 208 starting from the next memory location of the memory 208. On the other hand, if the last new block bn' has been stored, the data for the next set of N original blocks b1 to bn is received and stored in the temporary memory (steps 4a to 4d).

An example of how the method above converts the original blocks b1 to bn shown in FIG. 3A to the new blocks b1' to bn' shown in FIG. 3B will be described below. First, the original blocks b1 to bn are sequentially received and stored in the temporary memory 201 (steps 4a to 4d). After the last block bn is stored (step 4b), a first portion of the first original block b1 is read from the memory 201 (steps 4e to 4g). However, since the length of the block b1 is longer than the specified bit rate length S1 (step 4g), the last portion of the original block b1 is not read. Then, the first portion of the original block b1 is stored in the standby memory 208 as the new block b1' (step 4h), and the memory 208 is prepared to receive the second new block b2' (step 4j). Afterwards, the last portion of the first original block b1 and a first portion of the second original block b2 is read from the memory 201 (steps 4e to 4g) and stored in the standby memory as the second new block b2' (step 4h), and the memory 208 is prepared to receive the second new block b2' (step 4j). Then, steps 4e to 4j are repeated until the last new block bn' has been stored in the standby memory 208 (or until all of the data from the original blocks b1 to bn have been processed from the temporary memory 201) (step 4e). After all of the data for the original blocks b1 to bn has been processed and stored in the memory 208, the next set of original blocks b1 to bn are stored in the temporary memory 201 (steps 4a to 4d). Then, the process is repeated until no more data exists to be processed (step 4i).

As described above, if a certain original block bx has a bit rate which is longer than the specified bit rate S1, only a portion of the block b1 is stored in the standby memory 208 as the new block bx'. Thus, the data can be processed at the specified bit rate S1. Also, since the manner in which the original blocks b1 to bn are converted into the new blocks b1' to bn' is relatively simple, the processing time of the transmitter device is substantially reduced. Also, the complexity or the transmitter device and a corresponding receiver device is dramatically reduced.

Figure 5:
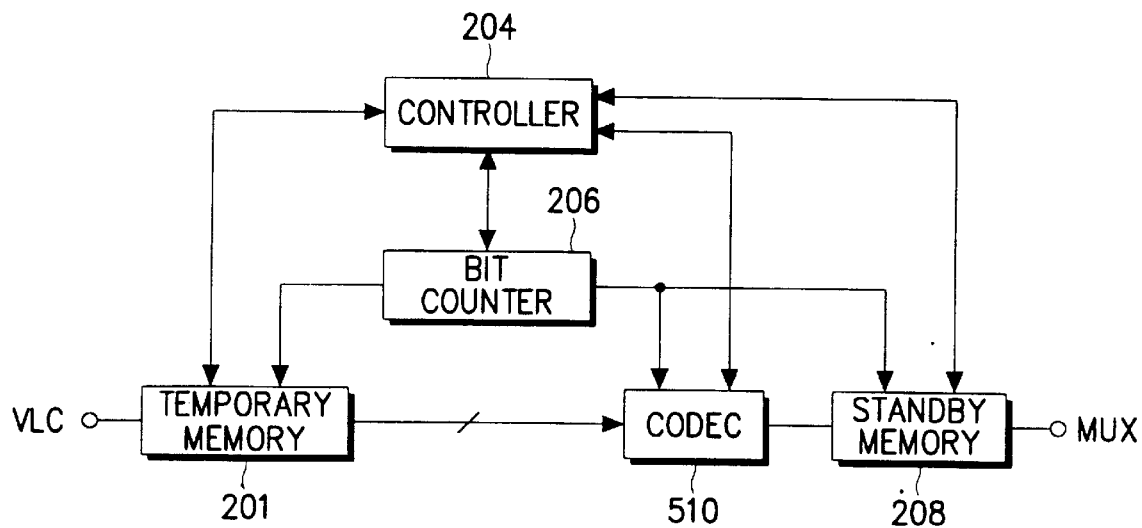
FIG. 5 is a block diagram of a video data transmission device according to another preferred embodiment of the present invention.

FIG. 5 shows a block diagram of a video data transmission device according to second preferred embodiment of the present invention. The second embodiment is similar to the first embodiment shown in FIG. 2 except that the transmission device includes a codec 501.

In the transmission device, the temporary memory 201 temporarily stores N VLC length coding data blocks (or symbols) b1 to bn. The controller 204 evaluates the state of the original blocks b1 to bn input to the temporary memory 201 and outputs control signals the bit counter 206 based on the state of the original blocks b1 to bn. In response to the control signals, the bit counter 206 generates address signals for storing the blocks b1 to bn, reads the blocks b1 to bn from the temporary memory 201 at a variable bit rates, and generates address signals for writing the original blocks b1 to bn into the standby memory 208 at a specified bit rate S2 to form new blocks b1' to bn'. The standby memory 208 sequentially stores the new blocks b1' to bn' at the specified bit rate S2, and subsequently the new blocks b1' to bn' are read from the standby memory 208 and transmitted. The codec 501 adjusts the bit rates of the blocks b1 to bn to the specified bit rate S2 before the blocks b1 to bn are stored in the memory 208 as the new blocks b1' to bn'. For example, the codec 510 may adjust the bit rates by controlling the bit counter 206 (via the controller 204) according to the bit rate states of the original blocks b1 to bn. Also, the controller 204 may control the bit counter 206 by checking the bit rate state of the blocks b1 to bn to thereby enable the codec 510 to read the blocks b1 to bn from the temporary memory 201 by the variable bit rates of the blocks b1 to bn and to convert the bit rates to the specified bit rate S2.

Figures 6A, 6B:
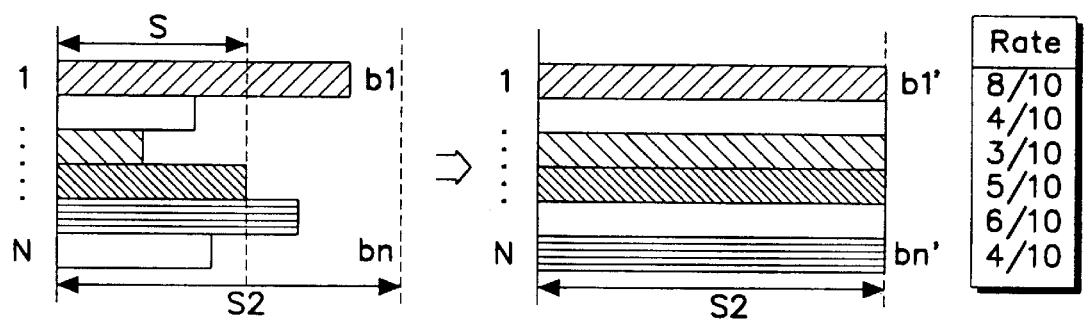
FIG. 6A is a diagram for showing a bit planarization process according to another preferred embodiment of the present invention.
FIG. 6B is another diagram for showing a bit planarization process according to another preferred embodiment of the present invention.
Figure 7:
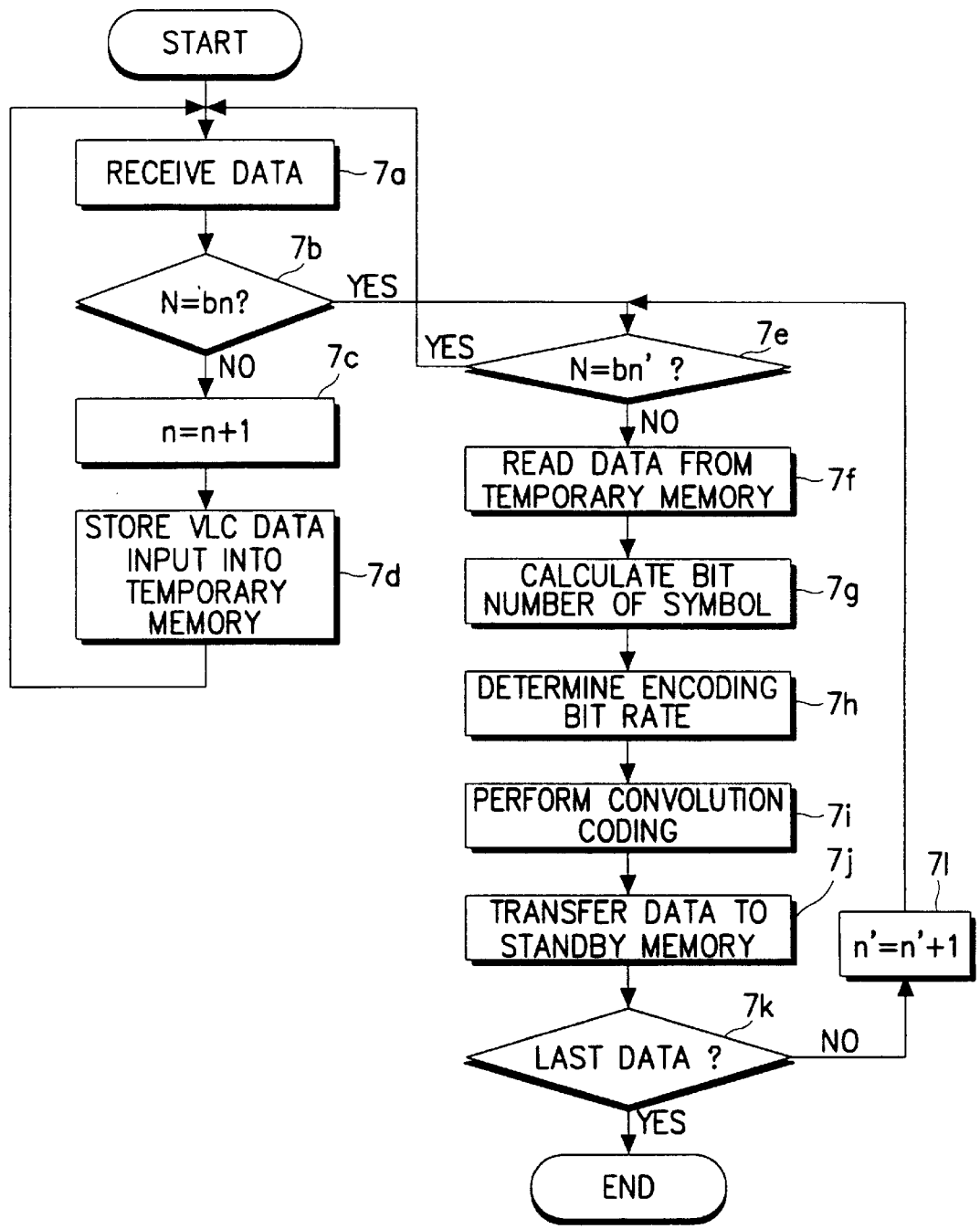
FIG. 7 is a flow chart of a method for transmitting video data which is employed by the device shown in FIG. 5.

FIG. 7 shows a flow chart of an illustrative method by which the present embodiment processes the N original symbols b1 to bn stored in the temporary memory 201 to produce N new blocks b1' to bn' and transfers the blocks b1' to bn' to the standby memory 208. The flow chart comprises four main processing steps. In the first step, the controller 204 controls the bit counter 206 such that the N blocks b1 to bn are sequentially stored in the temporary memory 201 as shown in FIG. 6A. In the second step, the controller 204 determines if the block bx currently being stored in the memory 201 is the last block bn. If the current block bx is the last block bn, the controller 204 sequentially reads the blocks b1 to bn stored in the temporary memory 201 and calculates the bit rate of the blocks b1 to bn to determine an encoding bit rate at which the blocks b1 to bn are to be encoded by the codec 501. In the third step, when the encoding bit rate for a particular original block bx is determined, convolution coding is performed on the block bx in accordance with the encoded bit rate, and the block bx is stored in the standby memory as the new block bx'. In the fourth step, the data for the encoding bit rate of the next original block bx+1 is calculated, convolution coding is performed on the block bx+1 in accordance with the encoded bit rate, and the block bx+1 is stored in the standby memory as the new block b(x+1)'. Then, the process above is repeated until all of the data for the original blocks b1 to bn is processed and stored in the standby memory 208 as the new blocks b1' to bn'.

In a preferred embodiment, FIG. 7 converts the blocks b1 to bn having variable bit rate streams into blocks b1' to bn' having fixed bit rate stream by using an unequal error protection (UEP) procedure. In the UEP procedure the VLC blocks b1 to bn undergo channel coding with different weights according to their significance.

A more detailed description of the process illustrated in FIG. 7 will be described below. First, the controller 204 sets the temporary memory 201 in a write mode and instructs the bit counter 206 to generate address signals so that the temporary memory 201 can begin receiving data corresponding to a first original block b1 of N original blocks b1 to bn (step 7a). Then, the controller 204 determines if the data of the original block bx (i.e. the first block b1) currently being received corresponds to data for the last block original bn (step 7b). If the current original block bx is not the last block bn, the controller 204 instructs the bit counter 206 to output address signals to prepare the temporary memory 201 to receive data for the next block bx+1 (step 7c) and instructs the bit counter 206 and memory 201 to store the data for the current original block bx (step 7d). Steps 7a to 7d are repeated until the data for the N original blocks b1 to bn are sequentially stored in the memory 201 as shown in FIG. 6A.

If the controller 204 determines that the last original block bn has been stored in the temporary memory 201 in step 7b, the controller 204 sets the temporary memory 201 in a read mode and instructs the bit counter 206 to generate the appropriate address signals to sequentially read the first original block b1 from the memory 201. Then, the controller 204 determines if the data of the last new block bn' has been written to the standby memory 208 (step 7e). If the data of the block bn' has not been written, the currently received block bx (i.e. the first original block b1) is read from the temporary memory 201 (step 7f).

Then, the controller 204 calculates the number of bits and/or bits rate of the current block bx (step 7g), and the controller 204 determines an appropriate encoding bit rate needed to adjust the bit rate of the current block bx to the specified bit rate S2 based on the calculated number of bits and/or bit rate of the block bx (step 7h). Afterwards, the controller 204 controls the codec 510 to perform convolution coding on the current block x to produce a new block bx' having a bit rate which equals the specified bit rate S2 (step 7i). Then, the standby memory 208 is set in a write mode, and the new block bx' is transferred to and stored in the standby memory 208 (step 7j).

After the new block bx' is stored in the standby memory 208, the controller 204 determines if the current set of N original blocks b1 to bn has been processed as well as all subsequent sets of N original blocks b1 to bn (step 7k). If all sets of blocks n1 to bn have not been processed., the controller 204 instructs the bit counter 206 to generate address signals to prepare the standby memory 208 to receive the next new block b(x+1)' (step 7l).

Then, in step 7e, the controller 204 determines if the data of the last new block bn' has been written to the memory 208. If such data has not been written, the original blocks b1 to bn continue to be subsequently read from the memory 208 starting from the next memory location of the memory 208. On the other hand, if the last new block bn' has been stored, the data for the next set of N original blocks b1 to bn is received and stored in the temporary memory (steps 7a to 7d).

As described above, the original blocks b1 to bn which have different bit rates and which are stored in the temporary memory 201 shown in FIG. 6A are converted into the new blocks b1' to bn' which have the same specified bit rate S2 and which are stored in the standby memory 208 shown in FIG. 6B.

The convolution coding operation performed by the codec 510 in FIG. 7i can be determined by the ratio of the rate at which the blocks b1 to bn are input to the rate at which the blocks b1' to bn' are output. As the ratio becomes lower (i.e. as the number of the output blocks b1' to bn' becomes higher than the number of the input blocks b1 to bn), the redundancy increases, and thus, the error resilience is enhanced. For example, in FIG. 6A, the blocks having longer VLC bit rates (e.g. block b1) include the majority of high frequency components, and the blocks having shorter VLC bit rates (e.g. block b3) include the majority of low frequency components. Thus, as a result of the present invention, obtaining a fixed bit rate (i.e. the bit rate S2) is possible, and the error resilience of the blocks having the majority of low frequency components can be enhanced. In other words, the bit counter 206 recognizes the number of bits of the blocks b1 to bn stored in the temporary memory 201, and the codec 510 performs the variable rate coding for the data of the blocks b1 to bn such that the data for the blocks b1 to bn have the same bit rate as the specified bit rate S2. The coded data of the blocks b1 to bn is stored into the standby memory 208 as the blocks b1' to bn'. Then, the blocks b1' to bn' are output to a multiplexer (not shown). The above process is repeated for all the VLC data.

As described above, when video data is transmitted via a radio channel or other channel with a lower error resilience, the present invention is capable of enhancing the error resilience of the channel by simply converting the variable rate data into fixed rate data. Also, by employing a variable rate codec, the present invention is more effective in protecting blocks having a higher significance, and thus, burst errors are minimized.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A device for transmitting video data, comprising:

a temporary memory which stores N original blocks of data which are variable length coded such that a plurality of said blocks have different bit rate lengths;

a standby memory which sequentially stores N processed blocks such that said N processed blocks each have a bit rate length that is equal to or less than a specified bit rate length and which subsequently outputs said N processed blocks to be transmitted at a fixed bit rate;

a bit counter which is operably coupled to said temporary memory and said standby memory, which generates address signals for storing said N original blocks in said temporary memory, and which generates an address signal for storing said N processed blocks in said standby memory; and a controller which is coupled to said bit counter, said temporary memory, and said standby memory, which determines a data state of said N original blocks input to said temporary memory and which uses said data state to control said bit counter to read original data of said N original blocks from said temporary memory at a reading bit rate which is shorter than or equal to said specified bit rate and to write said original data in said standby memory as said N processed blocks.

2. The device as claimed in claim 1, wherein said N original blocks stored in said temporary memory have the same starting points and a plurality of said N original blocks stored in said temporary memory have different ending points, and wherein a plurality of said N processed blocks stored in said standby memory have different starting points.

3. The device as claimed in claim 1, wherein a first original block of said N original blocks has a first portion and a second portion and has a first bit rate length, and wherein said controller controls said bit counter to store only said first portion of said first original block as a first processed block in said standby memory when said first bit rate length is longer than said specified bit rate length.

4. The device as claimed in claim 1, wherein a second marginal block has a first portion and a second portion, wherein said controller controls said bit counter to store said second portion of said first original block and at least a first portion of said second original block as a second processed block in said standby memory when said first bit rate length is longer than said specified length.

5. The device as claimed in claim 1, wherein said N original blocks have a first original block having a first bit rate length and have a second original block having a first portion and a second portion, and wherein said controller controls said bit counter to store said first original block and said first portion of said second original block as a first processed block in said standby memory when said first bit rate length is less than said specified bit rate length.

6. The device as claimed in claim 5, wherein said controller controls said bit counter to store at least said second portion of said second original block as a second processed block in said standby memory when said first bit rate length is less than said specified length.

7. A method for transmitting video data, comprising the steps of:

(a) storing N original blocks in a temporary memory;

(b) reading first block data corresponding to a first original block of said N original blocks from said temporary memory, wherein said first block data has a first portion and a second portion;

(c) determining if said first original block has a first bit rate length longer than a specified bit rate length; and (d) storing only said first portion of said first block data in a standby memory as a first processed block if said first bit rate length is longer than said specified bit rate length.

8. The method as claimed in claim 7, further comprising the step of:

(e) storing said first and second portions of said first block data in said standby memory as at least part of said first processed block if said first bit rate length is shorter than said specified bit rate length.

9. The method as claimed in claim 7, further comprising the steps of:

(e) reading second block data corresponding to a second original block of said N original blocks from said temporary memory after said first block data has been stored in said standby memory, wherein said second block data has a first portion and a second portion; and (f) sequentially storing said second portion of said first block data in said standby memory and at least said first portion of said second block data as said second processed block if said first bit rate length is longer than said specified bit rate length.

10. The method as claimed in claim 8, further comprising the steps of:

(e) reading second block data corresponding to a second original block of said N original blocks from said temporary memory after said first block data has been stored in said standby memory, wherein said second block data has a first portion and a second portion;

(f) sequentially storing said first portion of said second block data after said second portion of said first block data in said first processed block if said first bit rate length is shorter than said specified bit rate length.

11. The method as claimed in claim 9, further comprising the steps of:

(g) storing said first and second portions of said first block data in said standby memory as at least part of said first processed block if said first bit rate length is shorter than said specified bit rate length.

12. The method as claimed in claim 11, further comprising the steps of:

(h) reading second block data corresponding to a second original block of said N original blocks from said temporary memory after said first block data has been stored in said standby memory, wherein said second block data has a first portion and a second portion; and (i) sequentially storing said first portion of said second block data after said second portion of said first block data in said first processed block if said first bit rate length is shorter than said specified bit rate length.

13. A device for transmitting video data, comprising:

a temporary memory which stores N original blocks of data which are variable length coded such that a plurality of said blocks have different bit rate lengths;

a standby memory which sequentially stores N processed blocks such that said N processed blocks respectively have bit rate length that are equal to a specified bit rate length and which subsequently outputs said N processed blocks to be transmitted at a fixed bit rate;

a bit counter which is operably coupled to said temporary memory and said standby memory, which generates address signals for storing said N original blocks in said temporary memory, and which generates an address signal for storing said N processed blocks in said standby memory;

a codec which sequentially inputs said N original blocks from said temporary memory, which converts said N original blocks into said N processed blocks, and which outputs said N processed blocks to said standby memory; and a controller which is coupled to said bit counter, said temporary memory, said standby memory, and said codec, which determines a data state of said N original blocks input to said temporary memory and which uses said data state to control a manner in which said codec converts said N original blocks into said N processed blocks.

14. A device as claimed in claim 13, wherein said codec converts said N original blocks to said N processed blocks by adjusting said bit rate lengths of each of said N original blocks to equal said specified bit rate length.

15. A method for transmitting video data, comprising the steps of:
(a) storing N original blocks in a temporary memory;
(b) designating a first original block of said N original blocks as a current original block, wherein said current original block has a current bit rate length;
(c) reading current block data corresponding to said current original block;
(d) adjusting said current bit rate length to equal a particular bit rate length to convert said current original block into a current processed block;
(e) storing said current processed block in a current memory location of a standby memory.

16. The method as claimed in claim 15, further comprising the steps of:
(f) designating a next original block of said N original blocks in said temporary memory as said current original block; and
(g) repeating said steps (c) to (f) until said N original blocks have been converted into N processed blocks.

17. The method as claimed in claim 15, wherein said step (d) comprises the steps of:

(d1) determining at least one of a current number of bits and said current bit rate length of said current original block based on said current block data;
(d2) determining a current encoding bit rate for said current original block based on said at least one of said current number of bits and said current bit rate length; and
(d3) performing a convolution encoding operation on said current original block based on said encoding bit rate to produce said current processed block.

18. The device as claimed in claim 3, wherein a bit rate length of said first portion of said first block data substantially equals said specified bit rate length.

19. The device as claimed in claim 5, wherein a sum of bit rate lengths of said first original block and said first portion of said second original block substantially equals said specified bit rate length.

20. The device as claimed in claim 7, wherein a bit rate length of said first portion of said first block data substantially equals said specified bit rate length.

21. The device as claimed in claim 9, wherein a sum of bit rate lengths of said second portion of said first block data and said at least said first portion of said second block data substantially equals said specified bit rate length.

* * * * *